United States Patent
Hao et al.

(10) Patent No.: US 12,541,411 B2
(45) Date of Patent: Feb. 3, 2026

(54) FAILURE PREDICTION APPARATUS AND METHOD FOR STORAGE DEVICES

(71) Applicant: SAMSUNG ELECTRONICS CO., LTD., Suwon-si (KR)

(72) Inventors: Wenwen Hao, Suwon-si (KR); Yuqi Zhang, Suwon-si (KR); Chankyu Koh, Suwon-si (KR); Yongwong Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/451,460

(22) Filed: Aug. 17, 2023

(65) Prior Publication Data

US 2024/0160511 A1  May 16, 2024

(30) Foreign Application Priority Data

Nov. 14, 2022 (CN) .......................... 202211424591.6

(51) Int. Cl.
*G06F 11/00* (2006.01)
*G06F 11/07* (2006.01)

(52) U.S. Cl.
CPC ........ *G06F 11/0751* (2013.01); *G06F 11/008* (2013.01); *G06F 11/0727* (2013.01)

(58) Field of Classification Search
CPC ............... G06F 11/008; G06F 11/0727; G06F 11/0751; G06N 3/0442; G06N 3/0464
See application file for complete search history.

(56) References Cited

U.S. PATENT DOCUMENTS

| | | | |
|---|---|---|---|
| 9,229,796 B1* | 1/2016 | Ma | G06F 11/3452 |
| 10,635,324 B1 | 4/2020 | Klein et al. | |
| 11,003,561 B2 | 5/2021 | Ayyagari et al. | |
| 11,132,133 B2 | 9/2021 | Dedrick | |
| 2015/0205657 A1* | 7/2015 | Clark | G06F 11/0727 714/47.3 |
| 2020/0104200 A1* | 4/2020 | Kocberber | G06N 3/082 |
| 2021/0124502 A1 | 4/2021 | Elyasi et al. | |
| 2021/0342205 A1 | 11/2021 | Mcguinness et al. | |

(Continued)

OTHER PUBLICATIONS

Li, Qiuting et al., Fault Diagnosis for Rolling Bearing Based on RF-LSTM, 2021, IEEE (Year: 2021).*

(Continued)

*Primary Examiner* — Marc Duncan
(74) *Attorney, Agent, or Firm* — MORGAN, LEWIS & BOCKIUS LLP

(57) ABSTRACT

A failure prediction apparatus and method for storage devices are provided, the method including: obtaining attribute information of a plurality of attributes for a plurality of storage devices during operation of a storage apparatus; obtaining global attribute information for each of the plurality of storage devices based on the attribute information of the plurality of attributes obtained within a first time window before the current time; and predicting failures for the plurality of storage devices using a trained machine-learning model based on attribute information of the plurality of attributes of each of the plurality of storage devices obtained within a second time window before the current time and the global attribute information of each of the plurality of storage devices.

20 Claims, 7 Drawing Sheets

(56) References Cited

U.S. PATENT DOCUMENTS

| | | |
|---|---|---|
| 2022/0066683 A1 | 3/2022 | Elyasi et al. |
| 2023/0161655 A1* | 5/2023 | Schlichting ........... G06F 11/008 706/21 |
| 2023/0236590 A1* | 7/2023 | Kamijima .......... G05B 23/0283 702/184 |

OTHER PUBLICATIONS

Coursey, Austin et al., Remaining Useful Life Estimation of Hard Disk Drives using Bidirectional LSTM Networks, 2021, IEEE (Year: 2021).*

Hu, Lihan et al., A disk failure prediction method based on LSTM network due to its individual specificity, 2020, Elsevier (Year: 2020).*

Cheng, Yiwei et al., Remaining Useful Life Prognosis Based on Ensemble Long Short-Term Memory Neural Network, 2020, IEEE (Year: 2020).*

Kalusivalingam, Aravind Kumar et al., Employing Random Forests and Long Short-Term Memory Networks for Enhanced Predictive Modeling of Disease Progression, 2021, International Journal of AI and ML (Year: 2021).*

\* cited by examiner

FAILURE PREDICTION APPARATUS AND METHOD FOR STORAGE DEVICES

CROSS-REFERENCE

This application claims priority under 35 U.S.C. § 119 to Chinese Patent Application No. 202211424591.6, filed on Nov. 14, 2022 in the Chinese Patent Office, the disclosure of which is incorporated by reference in its entirety.

FIELD

The present disclosure relates to storage technology, and more particularly relates to a failure prediction apparatuses and methods for storage devices.

DISCUSSION

With the development of data storage technologies, solid-state drives (SSDs) have become widely used in storage systems such as data centers. Since a failure of an SSD may lead to data center downtime or potentially permanent data loss, proactively predicting SSD failures in advance and enabling replacement before they actually fail may minimize potential impacts of SSD failures upon the data center. Existing failure prediction methods for an SSD may predict a failure for the SSD based on short-term Self-Monitoring Analysis and Reporting Technology (SMART) data from the SSD. However, some impending failures that may occur cannot be accurately predicted from such short-term data, resulting in suboptimal prediction accuracy for such impending SSD failures.

SUMMARY

Embodiments of the present disclosure may provide failure prediction apparatuses and methods for storage devices which can improve a failure prediction accuracy for the storage devices to optimize maintenance, load-balancing, and/or protect data security.

According to a non-limiting embodiment of the present disclosure, a failure prediction method for storage devices may include: obtaining attribute information of a plurality of attributes for a plurality of storage devices during operation of a storage apparatus; obtaining global attribute information for each of the plurality of storage devices based on the attribute information of the plurality of attributes obtained within a first time window before a current time, the global attribute information comprising at least one of a distribution characteristic of attribute information of each of the plurality of attributes for each of the plurality of storage devices, a trend characteristic of attribute information of each attribute for each of the plurality of storage devices and host attribute information, wherein the host attribute information is indicated by statistical information of the attribute information of the plurality of attributes for the plurality of storage devices obtained within the first time window; and predicting failures for the plurality of storage devices using a trained machine-learning model based on attribute information of the plurality of attributes of each of the plurality of storage devices obtained within a second time window before the current time and the global attribute information of each of the plurality of storage devices, wherein at least one of the first time window begins before the second time window, or a duration of the first time window is greater than a duration of the second time window.

In an embodiment, obtaining global attribute information comprises at least one of random forest processing or long short-term memory processing, and the trained machine-learning model comprises at least the other of random forest processing or long short-term memory processing.

In an embodiment, at least one of obtaining global attribute information or the trained machine-learning model comprises convolutional neural network processing.

In an embodiment, the distribution characteristic of attribute information of each attribute comprises a histogram characteristic of attribute information of each attribute, the trend characteristic of attribute information of each attribute comprises a statistical characteristic of attribute information of each attribute, and the statistical information corresponding to the attribute information of each attribute for the plurality of storage devices is represented by at least one of an average of attribute information of each attribute for the plurality of storage devices, an average of distribution characteristics of attribute information of each attribute of the plurality of attributes for the plurality of storage devices or an average of trend characteristics of attribute information of each attribute of the plurality of attributes for the plurality of storage devices.

In an embodiment, the attribute information of the plurality of attributes for the plurality of storage devices during operation of the storage apparatus comprises at least one of Self-Monitoring Analysis and Reporting Technology (SMART) information for the each of the plurality of storage devices and/or random-access memory (RAM)-related information for the each of the plurality of storage devices, and performance statistics information for each of the plurality of storage devices.

In an embodiment, the predicting failures for the plurality of storage devices comprises: inputting attribute information of the plurality of attributes for each of the plurality of storage devices obtained within the second time window into a local prediction module of the trained machine-learning model to obtain local failure prediction information for each of the plurality of storage devices; inputting the global attribute information for each of the plurality of storage devices into a global prediction module of the trained machine-learning model to obtain global failure prediction information for each of the plurality of storage devices; and inputting the local failure prediction information and the global failure prediction information for each of the plurality of storage devices into a decision module of the trained machine-learning model to output at least one of the following failure information for each of the plurality of storage devices: whether a failure may occur for each of the plurality of storage devices, a type of the failure that may occur for each of the plurality of storage devices, and a remaining lifetime of each of the plurality of storage devices.

In an embodiment, each of the local prediction module, the global prediction module and the decision module comprises at least one of a collection of decision trees or a neural network.

According to a non-limiting embodiment of the present disclosure, a failure prediction apparatus for storage devices may include: a first or short-term buffer configured to obtain attribute information of a plurality of attributes for a plurality of storage devices of a storage apparatus during operation; a second or long-term buffer configured to obtain global attribute information for each of the plurality of storage devices based on the attribute information of the plurality of attributes obtained within a first time window before the current time, the global attribute information comprising at least one of a distribution characteristic of attribute information of each of the plurality of attributes for the each storage device, a trend characteristic of attribute information of the each attribute for the each storage device and host attribute information, wherein the host attribute information is indicated by statistical information of the attribute information of the plurality of attributes for the plurality of storage devices obtained within the first time window; and a predicting unit configured to predict failures for the plurality of storage devices using a trained machine-learning model based on attribute information of the plurality of attributes of the each of the plurality of storage devices obtained within a second time window before the current time and the global attribute information of the each of the plurality of storage devices, wherein at least one of the first time window begins before the second time window, or a duration of the first time window is greater than a duration of the second time window.

In an embodiment, obtaining global attribute information comprises at least one of random forest processing or long short-term memory processing, and the trained machine-learning model comprises at least the other of random forest processing or long short-term memory processing.

In an embodiment, the distribution characteristic of attribute information of the each attribute comprises a histogram characteristic of attribute information of the each attribute, the trend characteristic of attribute information of the each attribute comprises a statistical characteristic of attribute information of the each attribute, and the statistical information corresponding to the attribute information of the each attribute for the plurality of storage devices is represented by at least one of an average of attribute information of the each attribute for the plurality of storage devices, an average of distribution characteristics of attribute information of the each attribute of the plurality of attributes for the plurality of storage devices and an average of trend characteristics of attribute information of the each attribute of the plurality of attributes for the plurality of storage devices.

In an embodiment, the attribute information of the plurality of attributes for the plurality of storage devices of the storage apparatus during operation comprises Self-Monitoring Analysis and Reporting Technology (SMART) information for the each of the plurality of storage devices, and/or random-access memory (RAM)-related information for the each of the plurality of storage devices, and performance statistics information for the each of the plurality of storage devices.

In an embodiment, the failure predicting unit is configured to: input attribute information of the plurality of attributes for each of the storage devices obtained within the second time window into a local prediction module of the trained machine-learning model to obtain local failure prediction information for each storage device; input the global attribute information for each of the plurality of storage devices into a global prediction module of the trained machine-learning model to obtain global failure prediction information for each of the plurality of storage devices; and input the local failure prediction information and the global failure prediction information for each of the plurality of storage devices into a decision module of the trained machine-learning model to output at least one of the following failure information for each of the plurality of storage devices: whether a failure may occur for the each storage device, a type of the failure that may occur for the each storage device, and a remaining lifetime of the each storage device.

In an embodiment, each of the local prediction module, the global prediction module and the decision module comprises at least one of a collection of decision trees or a neural network.

According to a non-limiting embodiment of the present disclosure, a computer-readable storage medium may store a non-transitory computer program, which when executed by a processor, executes a failure prediction method comprising the steps of: obtaining attribute information of a plurality of attributes for a plurality of storage devices of a storage apparatus during operation; obtaining global attribute information for each of the plurality of storage devices based on the attribute information of the plurality of attributes obtained within a first time window before the current time, the global attribute information comprising at least one of a distribution characteristic of attribute information of each of the plurality of attributes for the each storage device, a trend characteristic of attribute information of the each attribute for the each storage device and host attribute information, wherein the host attribute information is indicated by statistical information of the attribute information of the plurality of attributes for the plurality of storage devices obtained within the first time window; and predicting failures for the plurality of storage devices using a trained machine-learning model based on attribute information of the plurality of attributes of the each of the plurality of storage devices obtained within a second time window before the current time and the global attribute information of the each of the plurality of storage devices, wherein at least one of the first time window begins before the second time window, or a duration of the first time window is greater than a duration of the second time window.

In an embodiment, obtaining global attribute information comprises at least one of random forest processing or long short-term memory processing, and the trained machine-learning model comprises at least the other of random forest processing or long short-term memory processing.

In an embodiment, the processor is a main processor connected to the storage medium, wherein each of the plurality of storage devices is connected to the main processor.

In an embodiment, the processor is a host connected to the storage medium, wherein each of the plurality of storage devices is connected to the host.

In an embodiment, the processor is a Universal Flash Storage (UFS) system connected to the storage medium, wherein at least one of the plurality of storage devices is a UFS device connected to the UFS system, the UFS system further comprising a UFS interface configured for communications between the UFS host and the UFS device.

In an embodiment, the storage medium is disposed in a data center system, the data center system further comprising: a plurality of application servers; and a plurality of storage servers, wherein each storage server comprises a plurality of storage devices, wherein the processor comprises at least one of the plurality of application servers or at least one of the plurality of storage servers that is configured to perform the failure prediction method.

In an embodiment, the storage medium is disposed in an electronic device, the electronic device further comprising the processor.

BRIEF DESCRIPTION OF THE DRAWINGS

The above and other embodiments of the present disclosure may be understood through the following description taken in conjunction with the appended figures, in which.

DETAILED DESCRIPTION

Figure 1:
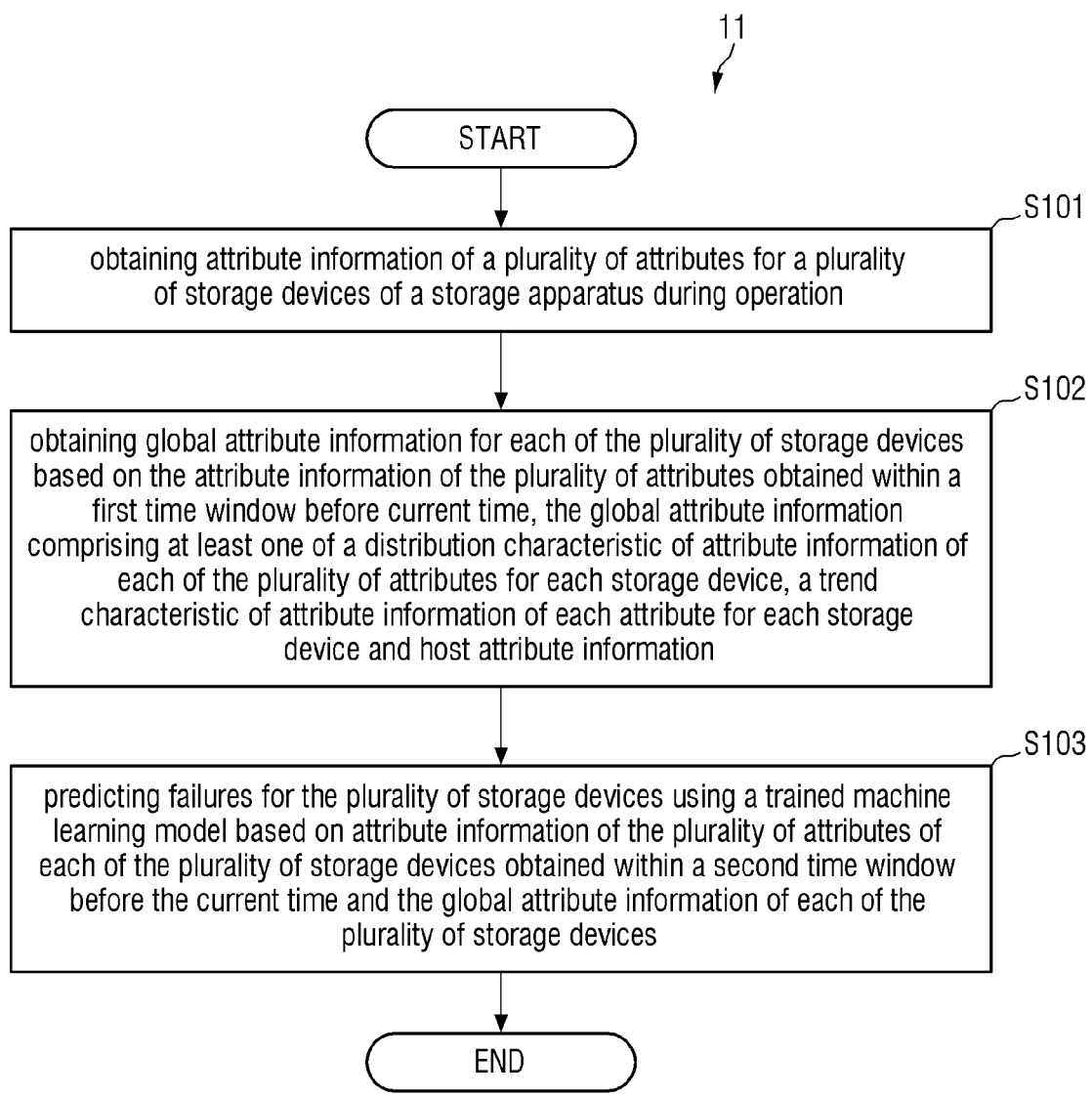
FIG. 1 is a flowchart diagram illustrating a failure prediction method for a storage device according to an embodiment of the present disclosure.

Hereinafter, illustrative embodiments of the present disclosure are described by way of example with reference to the accompanying drawings, in which same or like reference numerals may be used to depict same or like elements, features, and structures. However, the present disclosure is not intended to be limited by the various embodiments described herein by way of example, and it is intended that the present disclosure covers all modifications, equivalents, and/or alternatives of the present disclosure, provided they come within the scope of the appended claims and their equivalents. The terms and words used in the following description and claims are not limited to their dictionary meanings, but are used to enable a clear and consistent understanding of the present disclosure. Accordingly, it should be apparent to those of ordinary skill in the pertinent art that the following description of various embodiments of the present disclosure is provided for illustrative purposes, and not for the purposes of limitation, as defined by the appended claims and their equivalents.

It is to be understood that singular forms may include plural forms, unless the context clearly dictates otherwise. The terms "include", "comprise", and "have", as used herein, may indicate disclosed functions, operations, or elements; but shall not exclude other functions, operations, or elements.

In addition, expressions like "at least one of A and/or B" may indicate A and B, A, or B. Similarly, expressions like "A or B" may indicate A, B, or both A and B.

In various embodiments of the present disclosure, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the present disclosure, may be used interchangeably with expressions such as "suitable for," "having the capacity to," "designed to," "adapted to," "made to," and "capable of", for example, according to the situation. The term "configured to" need not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are chosen to describe certain illustrative embodiments of the present disclosure by way of example, but are not intended to limit the scope of other embodiments. Unless otherwise indicated herein, all terms used herein, including technical or scientific terms, may have the same meanings that are generally understood by a person skilled in the art. In general, terms defined in a dictionary may be considered to have the same meanings as the contextual meanings, and, unless clearly defined herein, should not be understood differently or as having an excessively formal meaning. In any case, even terms defined in the present disclosure are not intended to be interpreted as excluding embodiments of the present disclosure.

In order to better understand the present disclosure, suboptimal failure prediction methods for storage devices are first described.

Such failure prediction methods for storage devices may predict whether the storage device will fail based on Self-Monitoring Analysis and Reporting Technology (SMART) attribute information of the storage devices. Methods for predicting whether a storage device will fail based on SMART attribute information may be categorized into types including: 1) An SSD failure prediction method based on an Artificial Neural Network (ANN); and 2) An SSD failure prediction method based on a Long Short-Term Memory (LSTM) type of Recurrent Neural Network (RNN).

1) An SSD Failure Prediction Method Based on an Artificial Neural Network (ANN):

An example of this failure prediction method predicts whether a storage device will fail by using ANN based on a single piece of SMART attribute information or multiple pieces of SMART attribute information obtained within a small time window (e.g., a single piece of SMART attribute information collected at substantially the current time or multiple pieces of SMART attribute information collected within a recent period). Specifically, the method performs feature transformation on the original SMART data by using a Principal Component Analysis (PCA) method, and predicts whether the SSD will fail based on transformed features from the ANN. In addition, during the training of the ANN, the method uses a synthetic minority class oversampling technique (SMOTE) to increase the number of failure samples in order to train the ANN in a more reasonable way.

However, the number of features for an SSD in the SMART log is limited, and the prediction of whether the SSD will fail based on SMART data within a small time window ignores temporal information that may reflect differences between the variation trends of attributes of a failed SSD and a healthy SSD, and thus this method can only predict whether the SSD may fail, but cannot determine the specific type of failure that may occur nor a remaining lifetime of the SSD.

2) An SSD Failure Prediction Method Based on a Long Short-Term Memory (LSTM) Type of RNN:

An example of this method arranges SMART data within a larger time window into temporal data according to acquisition time, and uses the temporal data to predict whether a storage device will fail based on the LSTM.

However, although this method improves the accuracy of failure prediction by capturing temporal information, it cannot effectively predict potential future failures reflected by short-term attribute information.

FIG. 1 illustrates a failure prediction method 11 for a storage device according to an embodiment of the present disclosure.

Referring to FIG. 1, at step S101, attribute information is obtained for a plurality of attributes from a plurality of storage devices in a storage apparatus during operation.

As an example, a data storage apparatus may include a plurality of storage devices (e.g., SSDs), and during operation of the storage devices, attribute information for the plurality of attributes from each storage device, such as SMART data and/or telemetry data from each storage device, may be obtained. Such as defined in an NVMe Base Specification (e.g., NVMe 1.3), the SMART data indicates acquired operational status data of the storage device, and the telemetry data indicates vendor-defined attribute information about a storage device obtained through telemetry techniques.

As an example, the vendor-defined attribute information about a storage device may be attribute information that reflects an internal state of the storage device (e.g., SSD), such as random-access memory (RAM)-related information of the storage device, performance statistics information of the storage device, and the like.

During operation, for example, the attribute information of the plurality of attributes for the plurality of storage devices of the storage apparatus may include SMART information for each of the plurality of storage devices and/or RAM-related information for each of the plurality of storage devices, performance statistics information for each of the plurality of storage devices, or the like.

According to an embodiment of the present disclosure, since the information may be related to internal RAM of the storage device, and the performance statistics information of the storage device may reflect an internal state of the storage device, the failure prediction accuracy for the storage device may be improved if a failure of the storage device is predicted based on attribute information including both of these two types of information, for example.

At step S102, global attribute information for each of the plurality of storage devices is obtained based on the attribute information of the plurality of attributes obtained within a first time window before the current time, where the global attribute information may include at least one of a distribution characteristic of attribute information of each of the plurality of attributes for each storage device, a trend characteristic of attribute information of each attribute for each storage device, and host attribute information, wherein the host attribute information may be indicated by statistical information about the attribute information of the plurality of attributes for the plurality of storage devices obtained within the first time window.

As an example, the distribution characteristic of the attribute information of each attribute includes a histogram characteristic of the attribute information of each attribute, the trend characteristic of the attribute information of each attribute includes a statistical characteristic of the attribute information of each attribute, and the statistical information corresponding to the attribute information of each attribute for the plurality of storage devices is represented by at least one of an average of the attribute information of each attribute for the plurality of storage devices, an average of distribution characteristics of attribute information of each attribute of the plurality of attributes for the plurality of storage devices, and an average of trend characteristics of attribute information of each attribute of the plurality of attributes for the plurality of storage devices.

As an example, the statistical characteristic of the attribute information of each attribute for each storage device includes at least one of a range, a variance, a fluctuation factor, and/or a rate of change of values of each attribute for each storage device collected within the first time window.

It should be understood by those skilled in the art that any statistical characteristic that may reflect a long-term change or trend in the attribute information of a storage device, and/or a distribution of the long-term attribute information, may be used as the global attribute information.

As an example, when the storage apparatus includes a natural number M of SSDs, if another natural number N of attribute values corresponding to a first attribute of 83 attributes are obtained within the first time window for each SSD, M*N attribute values for the first attribute may be obtained for the M SSDs, and an average of the M*N attribute values may be used as the host attribute information corresponding to the first attribute of each storage device. Similarly, the host attribute information corresponding to the other attributes for each storage device may be obtained.

As another example, statistical information corresponding to attribute information of each attribute for the plurality of storage devices may be represented by other statistical characteristics (e.g., a range of values, a variance, a fluctuation factor, and/or a rate of change) of attribute information of each attribute for the plurality of storage devices.

At step S103, failures for the plurality of storage devices are predicted by using a trained machine-learning model based on attribute information of the plurality of attributes of each of the plurality of storage devices obtained within a second time window before the current time and the global attribute information of each of the plurality of storage devices, without limitation thereto.

According to an embodiment of the present disclosure, since failures of a storage device are predicted based on both short-term attribute information and long-term attribute information of the storage device, failures reflected by both short-term attribute information and long-term attribute information can be effectively predicted.

According to an embodiment of the present disclosure, the trained machine-learning model may include a global input channel for inputting the global attribute information and a local input channel, and be responsive to data input via the two channels. A first failure information reflected by short-term attribute information and a second failure information reflected by long-term attribute information may be obtained, respectively, and then a final failure prediction is made based on the first failure information and the second failure information. The multi-channel input structure may combine long-term attribute information and short-term attribute information to make more accurate predictions for failure-related tasks or scenarios.

According to an embodiment of the present disclosure, the trained machine-learning model may be a multi-task prediction model by which more information about failures of the storage device may be predicted.

As an example, the trained machine-learning model includes a global prediction module, a local prediction module, and a decision module.

As an example, each of the local prediction module, the global prediction module, and the decision module may be any one or more of a collection of decision trees such as a Random Forest (RF), or a neural network such as an Artificial Neural Network (ANN), a Convolutional Neural Network (CNN), a Recurrent Neural Network (RNN), a Long Short-Term Memory (LSTM) type of RNN, or the like.

As an example, the predicting failures for the plurality of storage devices using a trained machine-learning model based on the attribute information of the plurality of attributes of each of the plurality of storage devices obtained within a second time window before the current time and the global attribute information of each of the plurality of storage devices includes: inputting the attribute information of the plurality of attributes for each of the storage devices obtained within the second time window into a local prediction module of the trained machine-learning model to obtain local failure prediction information for each storage device; inputting the global attribute information for each storage devices into a global prediction module of the trained machine-learning model to obtain global failure prediction information for each storage device; and inputting the local failure prediction information and the global failure prediction information for each storage device into a decision module of the trained machine-learning model to output at least one of the following failure information for each storage device: whether a failure may occur for each storage device; a type of the failure that may occur for each storage device; and a remaining lifetime of each storage device.

According to an embodiment of the present disclosure, future possible failures of a storage device may be reflected by short-term attribute information and/or long-term attribute information for the storage device, and predicting failures of the storage device based on the short-term attribute information as well as a change trend and a distribution of the long-term attribute information enables more effective prediction of possible failures of the storage device.

According to an embodiment of the present disclosure, since more detailed information about failures may be predicted based on attribute information of storage devices, more reference data may be provided for the user to deal with SSDs that will fail, for example, more detailed failure information may facilitate the user to analyze a cause of a failure, thereby helping operator and maintainer to deal with and prevent SSD failures.

As an example, whether a storage device will fail may indicate a score of failure risk for the storage device and/or a probability that the storage device will fail.

As an example, the predicted remaining life of the storage device may be expressed as a time period section to which the remaining life belongs, e.g., time period section may be set to a day, a week, and a time period greater than a week, i.e., the predicted remaining life is a day, a week, or greater than a week.

The method for predicting failure information of a storage device using a trained machine-learning model is described above. A training process of the machine-learning model is described in the following.

A large amount of training sample data is preferred for training the machine-learning model; however, the training set may suffer from the problem that the number of failure samples is much smaller than the number of healthy samples due to the low failure rate of SSDs. The failure prediction model obtained by training on such an unbalanced data set may generally exhibit suboptimal performance.

As an example, to solve the imbalance problem in training sample data, a large number of new failure samples may be generated by combining portions of two original failure samples.

As an example, the failure sample training data used to train the machine-learning model is original failure samples corresponding to a plurality of storage devices (hereinafter referred to as a second plurality of storage devices for ease of description) of the same type as the plurality of storage devices (hereinafter referred to as a first plurality of storage devices for ease of description) of which failures are to be predicted, plus increased failure samples obtained by combining the original fault samples.

As an example, the increased failure samples are obtained by replacing data of a portion of the original failure samples of at least one of the second plurality of storage devices with data of corresponding portions of the original failure samples of the other storage devices of the second plurality of storage devices.

Figure 2:
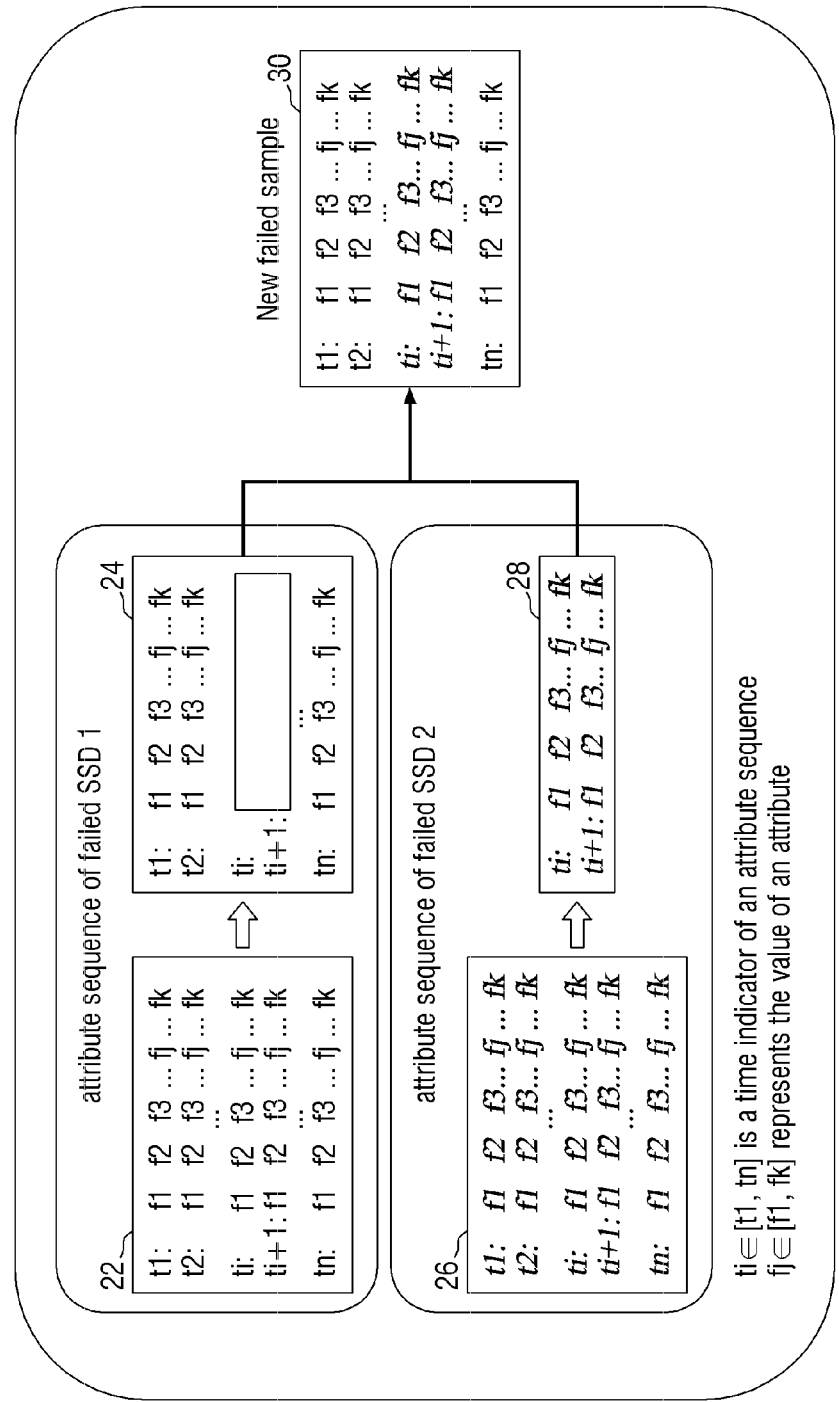
FIG. 2 is a schematic diagram illustrating a method for generating a new failure sample by combining two original failure samples, according to an embodiment of the present disclosure.

FIG. 2 illustrates a method 20 for generating a new failure sample 30 by combining two original failure samples 22 and 26 according to an embodiment of the present disclosure.

Referring to FIG. 2, two failure samples 22 and 26 are first randomly selected from the original data, and then a random region 24 of one of the two samples 22 is replaced with a corresponding region 28 of the other sample 26 to generate a new sample 30.

Through the above data enhancement method, it is possible to increase a ratio of the number of faulty samples to the number of healthy samples in the training set. For example, without using the data enhancement, the ratio of the number of the faulty samples to the number of the healthy samples in the training set is 1:1000, and the ratio of the number of faulty samples to the number of the healthy samples in the training set may be increased to 1:10 by using the data enhancement method according to the embodiment of the present disclosure. Once the number of the faulty samples and the number of the healthy samples in the data set is relatively balanced, the prediction model trained on such a data set may improve the failure prediction accuracy.

It should be understood by those skilled in the art that a form of input data and output data when training the machine-learning model is substantially similar or the same as a form of input data and output data when using a trained machine-learning model.

For example, if the machine-learning model is trained based on global attribute information and local attribute information of the storage device to predict whether a storage device will fail and remaining lifetime of the storage device that will fail, input data input to the machine-learning model should be global attribute information and local attribute information of a storage device, and the output data is indicative of whether the storage device will fail and the remaining life of the storage device when the trained machine-learning model is used for prediction.

As an example, each of the global prediction model, local prediction model, and the decision model included in the machine-learning model may be a machine-learning model based on Random Forest (RF), Convolutional Neural Network (CNN), or Long Short-Term Memory (LSTM). Since the method of training machine-learning models based on training datasets is an existing technique, it is not described here.

As an example, the global prediction module, the local prediction module, and the decision module may be trained separately or jointly.

As an example, forms of output information of the global prediction module, the local prediction module, and the decision module may be substantially similar or the same. For example, if the global prediction module predicts whether a storage device will fail, a type of a failure that may occur in the storage device, and a remaining lifetime of the storage device based on global attribute information extracted from the training set, the local prediction module predicts whether the storage device will fail, a type of a failure that may occur in the storage device, and a remaining lifetime of the storage device based on attribute information within a time window of the same size as the second time window, and the decision module predicts whether the storage device will fail, a type of failure that may occur in the storage device, and a remaining lifetime of the storage device based on prediction information of the global prediction module and the local prediction module.

The above describes a failure prediction method for a storage device according to an embodiment of the present disclosure with reference to FIGS. 1 and 2. A failure prediction device for a storage device, a data storage system, and a data storage apparatus according to an embodiment of the present disclosure are described below with reference to FIGS. 3 through 7.

Figure 3:
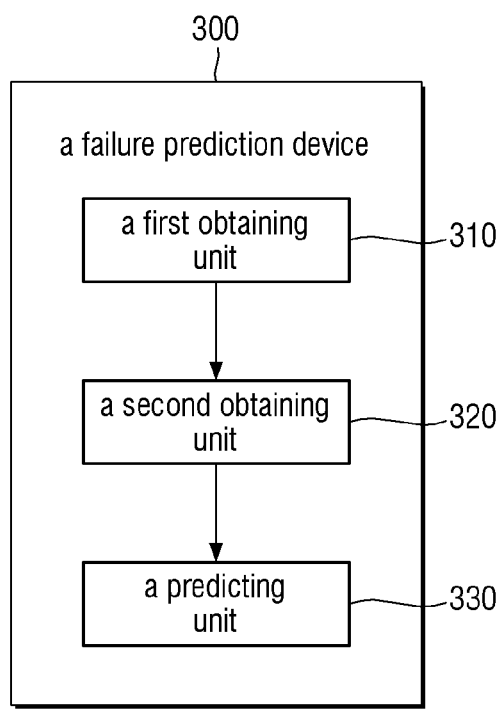
FIG. 3 is a block diagram illustrating a structure of a failure prediction device for a storage device according to an embodiment of the present disclosure.

FIG. 3 illustrates a structure of a failure prediction device 300 for a storage device according to an embodiment of the present disclosure.

Referring to FIG. 3, the failure prediction device 300 may include a first obtaining unit 310, such as a short-term buffer or neural processing unit, a second obtaining unit 320, such as a long-term buffer or neural processing unit, and a predicting unit 330. Those skilled in the art should understand that the failure prediction device 300 may additionally include other components, and at least one of the components in the failure prediction device 300 may be divided or combined.

As an example, the first obtaining unit 310 may be or include a neural processing unit implementing an Artificial Neural Network (ANN) or the like, configured to obtain attribute information of a plurality of attributes for a plurality of storage devices of a storage apparatus during operation.

As an example, the second obtaining unit 320 may be or include a neural processing unit implementing a Recurrent Neural Network (RNN) or the like, configured to obtain global attribute information for each of the plurality of storage devices based on the attribute information of the plurality of attributes obtained within a first time window before the current time, where the global attribute information includes at least one of a distribution characteristic for attribute information of each of the plurality of attributes for each storage device, a trend characteristic for attribute information of each attribute for each storage device, and host attribute information, wherein the host attribute information is indicated by statistical information of the attribute information of the plurality of attributes for the plurality of storage devices obtained within the first time window.

As an example, the predicting unit 330 may be or include a neural processing unit implementing a Convolutional Neural Network (CNN) or the like, configured to predict failures for the plurality of storage devices using a trained machine-learning model based on attribute information of the plurality of attributes of each of the plurality of storage devices obtained within a second time window before the current time and the global attribute information of each of the plurality of storage devices, wherein a duration of the first time window is greater than a duration of the second time window.

As an example, the distribution characteristic of attribute information of each attribute includes a histogram characteristic of attribute information of each attribute, the trend characteristic of attribute information of each attribute includes a statistical characteristic of attribute information of each attribute, and the statistical information corresponding to the attribute information of each attribute for the plurality of storage devices is represented by at least one of an average of attribute information of each attribute for the plurality of storage devices, an average of distribution characteristics of attribute information of each attribute of the plurality of attributes for the plurality of storage devices and an average of trend characteristics of attribute information of each attribute of the plurality of attributes for the plurality of storage devices.

As an example, the attribute information of the plurality of attributes for the plurality of storage devices of the storage apparatus during operation includes SMART information for each of the plurality of storage devices, and/or RAM-related information for each of the plurality of storage devices, and performance statistics information for each of the plurality of storage devices.

As an example, the failure predicting unit 330 may be configured to input the attribute information of the plurality of attributes for each of the storage devices obtained within the second time window into a local prediction module of the trained machine-learning model to obtain local failure prediction information for each storage device; input the global attribute information for each storage devices into a global prediction module of the trained machine-learning model to obtain global failure prediction information for each storage device; and input the local failure prediction information and the global failure prediction information for each storage device into a decision module of the trained machine-learning model to output at least one of the following failure information for each storage device: whether a failure may occur for each storage device, a type of the failure that may occur for each storage device, and a remaining lifetime of each storage device.

As an example, each of the local prediction module, the global prediction module and the decision module may be any one or more of a collection of decision trees such as a Random Forest (RF), or a neural network such as an Artificial Neural Network (ANN), a Convolutional Neural Network (CNN), a Recurrent Neural Network (RNN), a Long Short-Term Memory (LSTM) type of RNN, or the like.

Figure 4:
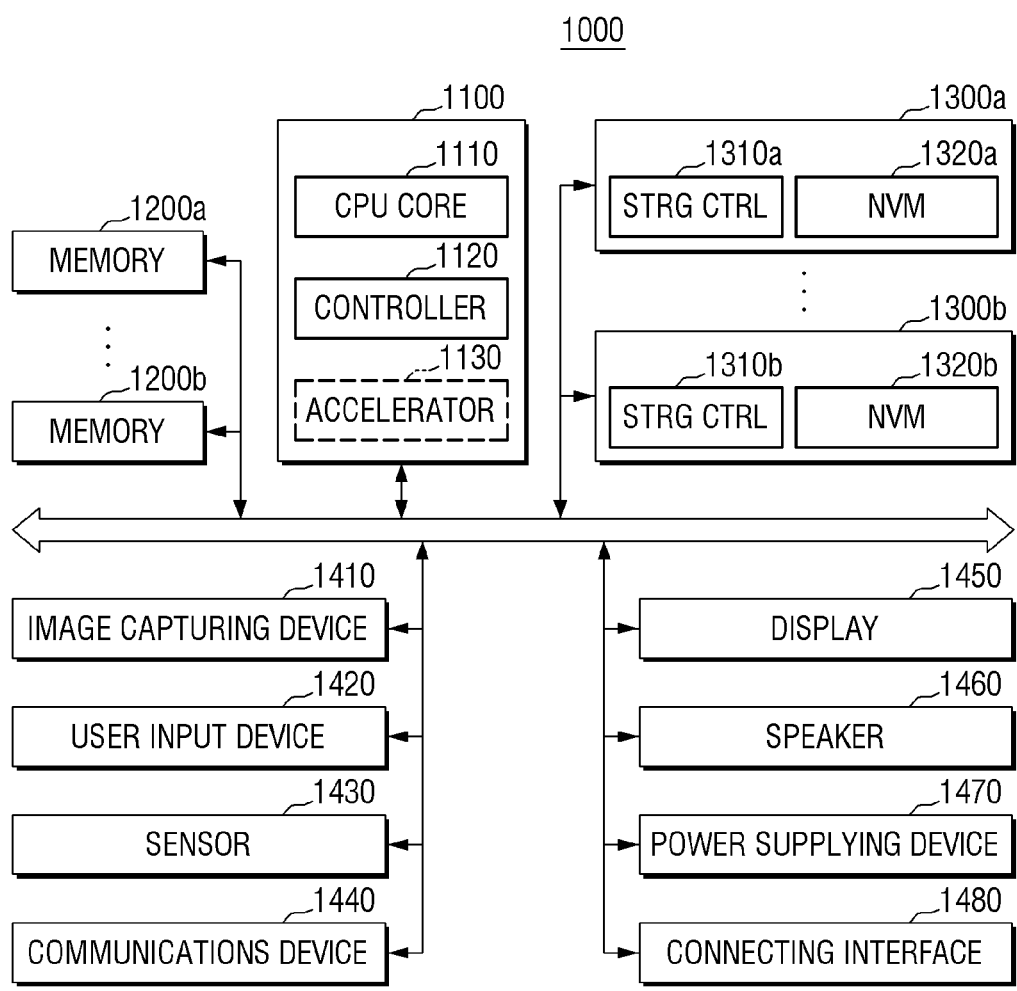
FIG. 4 is a schematic diagram illustrating a system to which a storage device is applied, according to an embodiment of the present disclosure.

FIG. 4 illustrates a system 1000 to which a storage device is applied according to an embodiment of the present disclosure.

The system 1000 of FIG. 4 may be a mobile system, such as a portable communications terminal (e.g., a mobile phone), a smartphone, a tablet personal computer (PC), a wearable device, a healthcare device, or an Internet of things (IOT) device. However, the system 1000 of FIG. 4 is not necessarily limited to the mobile system and may be a PC, a laptop computer, a server, a media player, or an automotive device (e.g., a navigation device), without limitation thereto.

Referring to FIG. 4, the system 1000 may include a main processor 1100, memories (e.g., 1200a through 1200b), and storage devices (e.g., 1300a through 1300b). In addition, the system 1000 may include at least one of an image capturing device 1410, a user input device 1420, a sensor 1430, a communications device 1440, a display 1450, a speaker 1460, a power supplying device 1470, and a connecting interface 1480.

The main processor 1100 may control operations of the system 1000, and more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a through 1200b and/or the storage devices 1300a through 1300b. In an embodiment, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a through 1200b may be used as main memory devices of the system 1000. Although each of the memories 1200a through 1200b may include a volatile memory, such as static random access memory (SRAM) and/or dynamic RAM (DRAM), each of the memories 1200a through 1200b may include non-volatile memory, such as a flash memory, stage-change RAM (PRAM) and/or resistive RAM (RRAM). The memories 1200a through 1200b may be implemented in the same package as the main processor 1100.

The storage devices 1300a through 1300b may serve as non-volatile storage devices configured to store data regardless of whether power is supplied thereto, and have larger storage capacity than the memories 1200a through 1200b. The storage devices 1300a through 1300b may respectively include storage controllers (STRG CTRL) 1310a through 1310b and NVM (Non-Volatile Memory)s 1320a through 1320b configured to store data via the control of the storage controllers 1310a through 1310b. Although the NVMs 1320a through 1320b may include flash memories having a two-dimensional (2D) structure or a three-dimensional (3D) V-NAND structure, the NVMs 1320a through 1320b may include other types of NVMs, such as PRAM and/or RRAM.

The storage devices 1300a through 1300b may be physically separated from the main processor 1100 and included in the system 1000, or they may be implemented in the same package as the main processor 1100. In addition, the storage devices 1300a through 1300b may have types of solid-state devices (SSDs) or memory cards and be removably combined with other components of the system 100 through an interface, such as the connecting interface 1480 that will be described below. The storage devices 1300a through 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communications device 1440 may transmit and receive signals between other devices outside the system 1000 according to various communications protocols. The communications device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), non-volatile memory express (NVMe), IEEE 1394, a universal serial bus (USB) interface, a secure digital (SD) card interface, a multi-media card (MMC) interface, an embedded multi-media card (eMMC) interface, a UFS interface, an embedded UFS (eUFS) interface, and a compact flash (CF) card interface.

As an example, there is provided a system to which a storage device is applied, including: a main processor (for example, 1100), a memory (for example, 1200a through 1200b); and a plurality of storage devices (for example, 1300a through 1300b), wherein the memory stores computer program, when executed by the main processor, causing the main processor to perform the failure prediction method for a storage device as described above.

Figure 5:
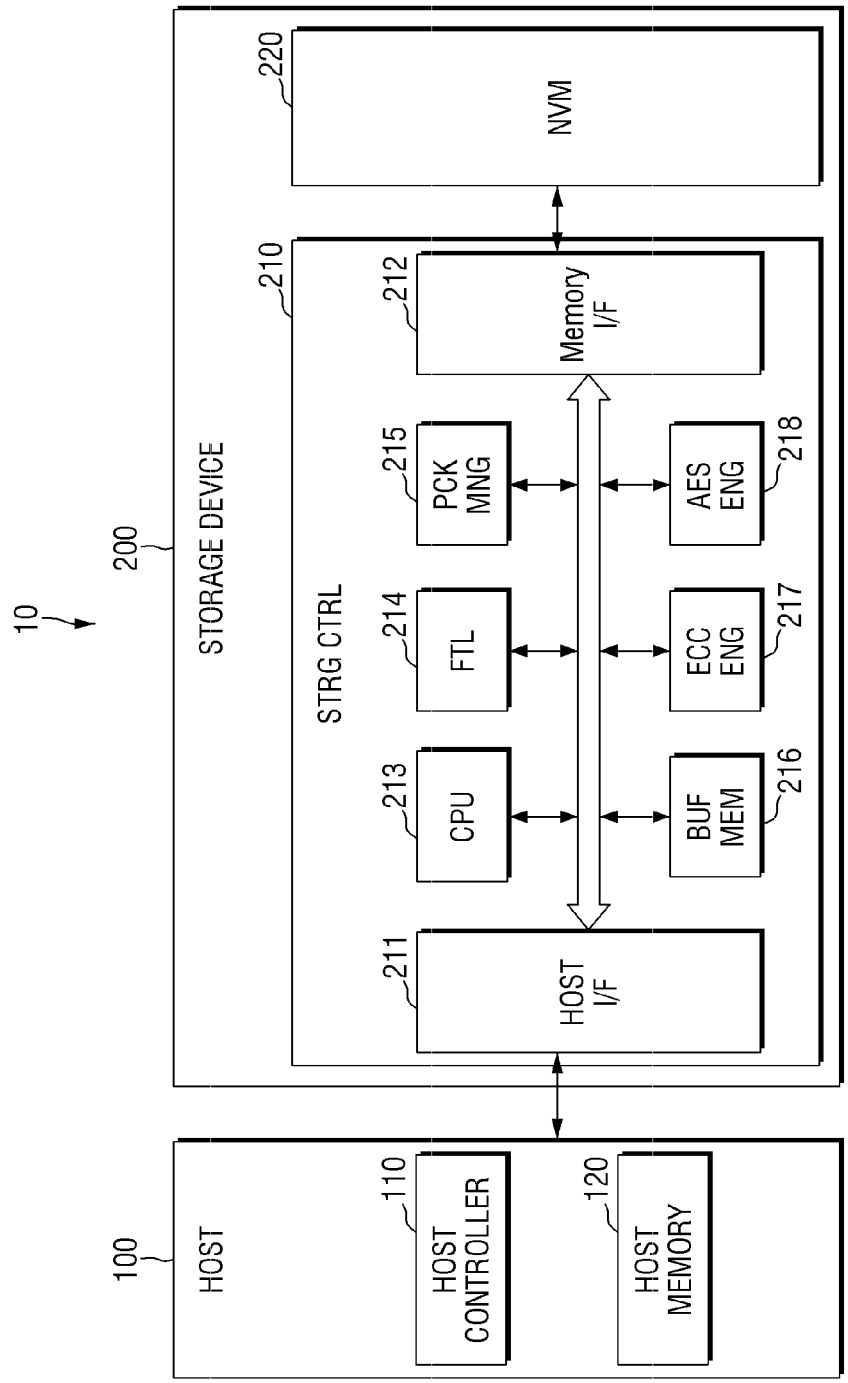
FIG. 5 is a block diagram illustrating a host storage system according to an exemplary embodiment.

FIG. 5 illustrates a host storage system 10 according to an embodiment of the present disclosure.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and/or a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), stage-change RAM (PRAM), resistive RAM (RRAM), and various other kinds of memories without limitation.

According to an embodiment, the host controller 110 and the host memory 120 may be implemented as separate semiconductor chips. Alternatively, in an embodiment, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or a non-volatile memory (NVM) or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or an open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by enabling blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

According to an embodiment of the present disclosure, a host storage system (for example, 10) is provided, including: a host (for example, 100); and a plurality of storage devices (for example, 200), wherein the host memory is configured to perform the failure prediction method for a storage device as described above.

Figure 6:
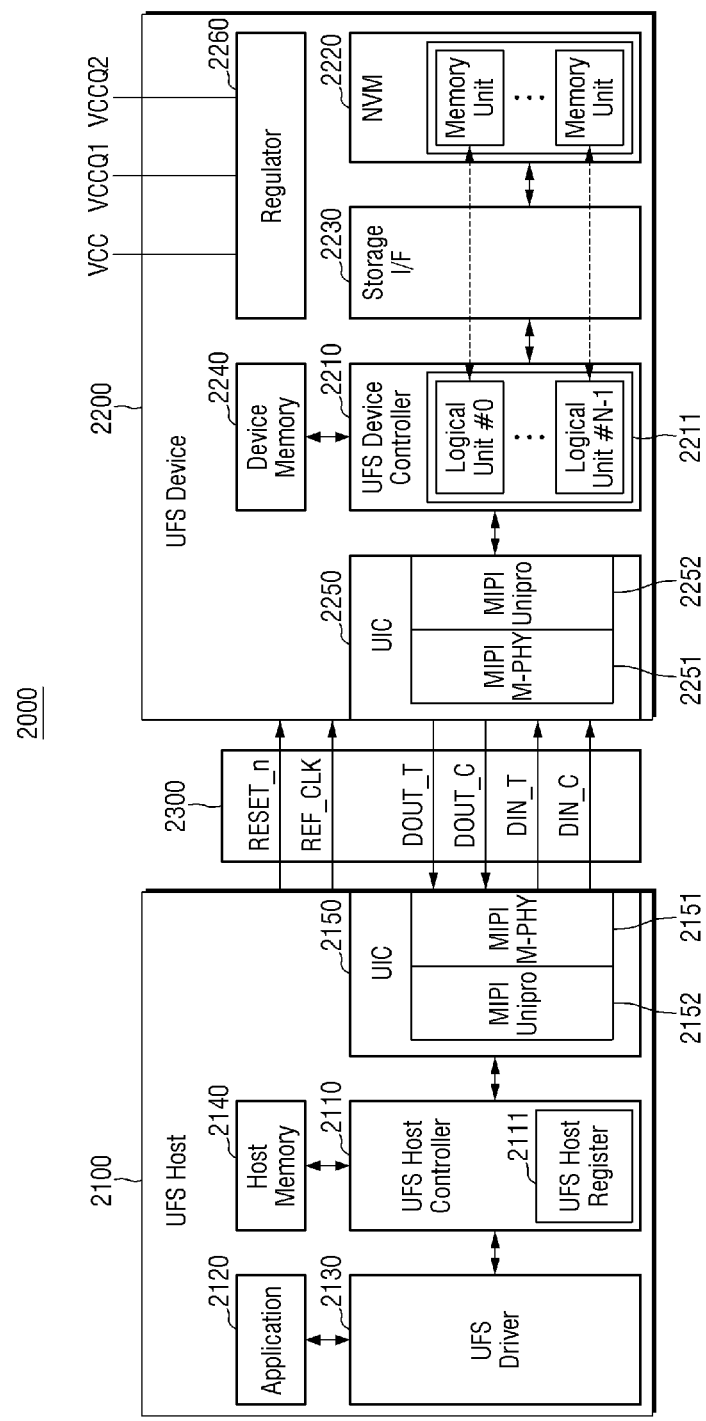
FIG. 6 is a block diagram illustrating a UFS system according to an embodiment.

FIG. 6 illustrates a UFS system 2000 according to an embodiment of the present disclosure.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 4 may also be applied to the UFS system 2000 of FIG. 6 within a range that does not conflict with the following description of FIG. 6.

Referring to FIG. 6, the UFS host 2100 may be connected to the UFS device 2200 through the UFS interface 2300. When the main processor 1100 of FIG. 4 is an AP, the UFS host 2100 may be implemented as a portion of the AP. The UFS host controller 2110 and the host memory 2140 may respectively correspond to the controller 1120 of the main processor 1100 and the memories 1200a through 1200b of FIG. 4. The UFS device 2200 may correspond to the storage device 1300a through 1300b of FIG. 4, and a UFS device controller 2210 and an NVM 2220 may respectively correspond to the storage controllers 1310a and 1310b and the NVMs 1320a and 1320b of FIG. 4.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate clock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 6, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 6, the number of transmission lanes and the number of receiving lanes may be changed.

The receiving lane and the transmission lane may transmit data based on a serial communications scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no reason to further provide a separate lane for data transmission in addition to a pair of receiving lanes and a pair of transmission lanes.

The UFS device controller 2210 of the UFS device 2200 may control operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address, such as a physical block address (PBA), by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (e.g., a 'ready-to-transfer' response) indicating that the UFS host 2100 is ready to receive user data (e.g., ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

According to an embodiment of the present disclosure, a UFS system is provided, including: a UFS host (for example, 2100); a UFS device (for example, 2200); and a UFS interface (for example, 2300), used for a communications between the UFS device and the UFS host, the UFS host is configured to execute the failure prediction method as described above.

Figure 7:
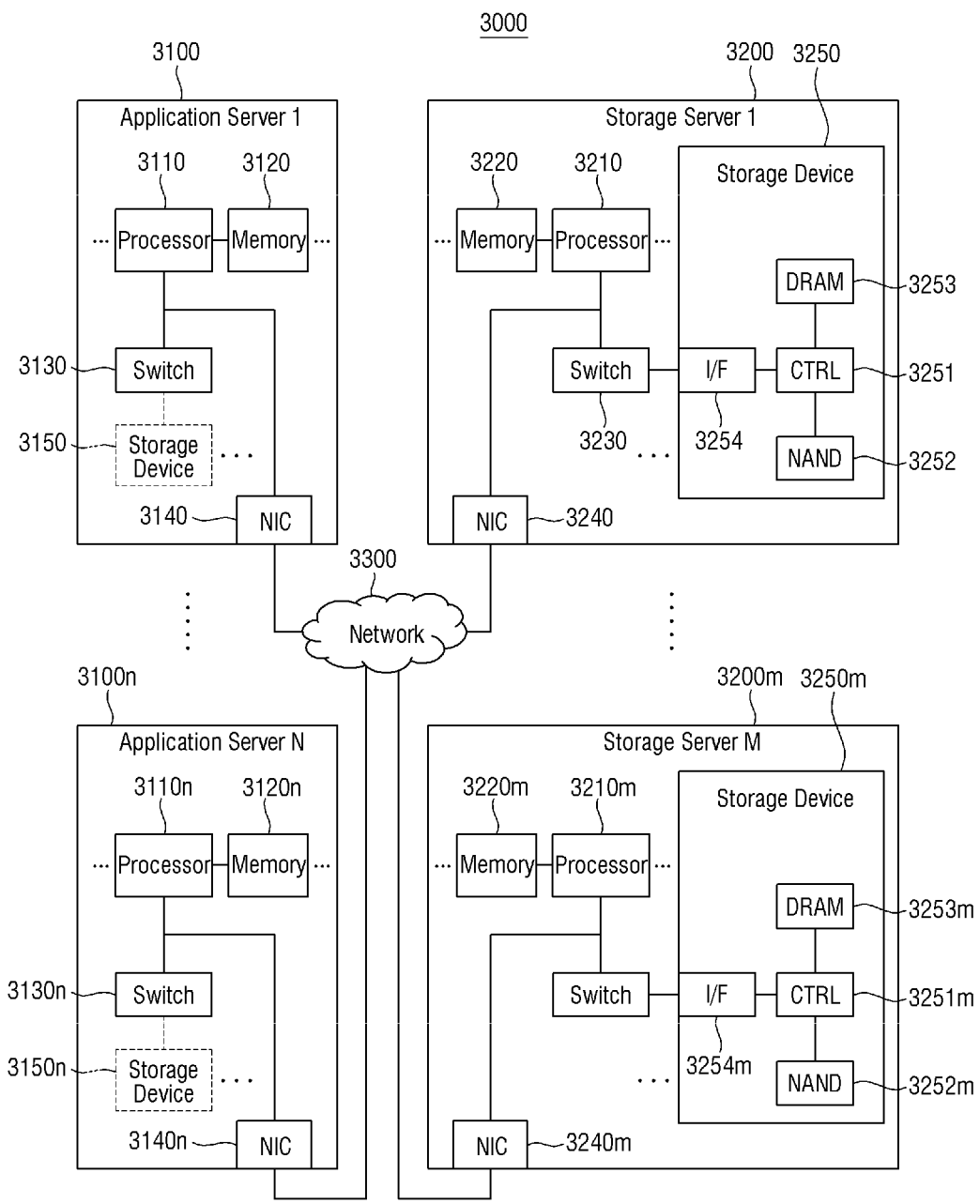
FIG. 7 is a block diagram illustrating a data center to which storage devices are applied according to an embodiment of the present invention.

FIG. 7 illustrates a data center 3000 to which a storage device is applied according to an embodiment of the present disclosure.

Platform Portion—Server (Application/Storage):

Referring to FIG. 7, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to an embodiment. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In an embodiment, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In an embodiment, the application server 3100 need not include a storage device 3150. The storage server 3200 may include at least one storage device 3250. The number of storage devices 3250 included in the storage server 3200 may be variously selected according to design criteria.

Platform Portion—Network:

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

Organic Relationship—Interface Structure/Type:

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the network interface card (NIC) or Network Inter-Connect 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

Organic Relationship—Interface Operation:

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

Product Portion—SSD Basic Operation:

The controller 3251 may control operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. In addition, the DRAM 3253 may store metadata. The metadata may be user data or data generated by the controller 3251 to manage the NAND flash memory device 3252. The storage device 3250 may include a secure element (SE) for security or privacy.

According to an embodiment of the present disclosure, a data center system (for example, 3000) is provided, including: a plurality of application servers (for example, 3100 through 3100*n*); and a plurality of storage servers (for example, 3200 through 3200*m*), wherein each storage server includes a plurality of storage devices, and at least one of the plurality of application servers and the plurality of storage servers is configured to perform the failure prediction method as described above.

According to an embodiment of the present disclosure, there is provided a computer-readable storage medium storing a computer program, when executed by a processor, implementing the failure prediction method for a storage device as described above.

According to an embodiment of the present disclosure, there is provided an electronic apparatus, including: a processor; and a memory storing a computer program, when executed by the processor, implementing the failure prediction method for a storage device as described above.

According to an embodiment of the present disclosure, there may also be provided a computer-readable storage medium storing instructions, when executed by at least one processor, causing the at least one processor to execute the failure prediction method for a storage device according to the present disclosure. Examples of computer-readable storage media here include: read-only memory (ROM), random access programmable read-only memory (PROM), electrically erasable programmable read-only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid-state Hard disk (SSD), card storage (such as multimedia card, secure digital (SD) card or extreme digital (XD) card), magnetic tape, floppy disk, magneto-optical data storage device, optical data storage device, hard disk, solid-state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

Those of ordinary skill in the pertinent art may easily construct other embodiments of the present disclosure after considering the disclosure and/or practicing the illustrative embodiments as disclosed herein. The present disclosure is intended to cover any variations, uses, or adaptive changes of all such embodiments. These variations, uses, or adaptive changes may follow the general principles of the present disclosure and include common knowledge or conventional technical means in the technical field that are not disclosed in the present disclosure. The specification and the embodiments are to be regarded as disclosure by way of non-limiting example, and the actual scope and spirit of the present disclosure are as set forth in the following claims.

What is claimed is:

1. A failure prediction method for a storage apparatus comprising a plurality of storage devices, the method comprising:
   generating a plurality of attributes for the plurality of storage devices by replacing a portion of failure samples in an attribute sequence of one of the storage devices with a portion of failure samples in an attribute sequence of another of the storage devices among the plurality of storage devices;
   generating global attribute information for each of the plurality of storage devices based on attribute information of the plurality of attributes corresponding to a first time window before a current time, the global attribute information comprising at least one of a distribution characteristic of attribute information of each of the plurality of attributes for each of the plurality of storage devices, a trend characteristic of attribute information of each attribute for each of the plurality of storage devices and host attribute information, wherein the host attribute information is indicated by statistical information of the attribute information of the plurality of attributes for the plurality of storage devices obtained within the first time window;
   generating local attribute information for each of the plurality of storage devices based on attribute information of the plurality of attributes corresponding to a second time window before a current time; predicting failures for the plurality of storage devices using a trained machine-learning model based on the generated global attribute information and the generated local attribute information of the generated plurality of attributes of each of the plurality of storage devices; and
   wear-leveling the plurality of storage devices based on the predicted failure,
   wherein at least one of the first time window begins before the second time window, or a duration of the first time window is greater than a duration of the second time window.

2. The method of claim 1,
   wherein generating global attribute information comprises performing recurrent neural network processing,
   wherein the trained machine-learning model comprises random forest processing or long short-term memory processing.

3. The method of claim 1, wherein the portion of failure samples in an attribute sequence of the one and the other storage devices are randomly selected from samples in the attribute sequences of the one and the other storage devices.

4. The method of claim 1, wherein the distribution characteristic of attribute information of each attribute comprises a histogram characteristic of attribute information of each attribute, the trend characteristic of attribute information of each attribute comprises a statistical characteristic of attribute information of each attribute, and the statistical information corresponding to the attribute information of each attribute for the plurality of storage devices is represented by at least one of an average of attribute information of each attribute for the plurality of storage devices, an average of distribution characteristics of attribute information of each attribute of the plurality of attributes for the plurality of storage devices or an average of trend characteristics of attribute information of each attribute of the plurality of attributes for the plurality of storage devices.

5. The method of claim 1, wherein the attribute information of the plurality of attributes for the plurality of storage devices during operation of the storage apparatus comprises at least one of Self-Monitoring Analysis and Reporting Technology (SMART) information for the each of the plurality of storage devices and/or random-access memory (RAM)-related information for the each of the plurality of storage devices, and performance statistics information for each of the plurality of storage devices.

6. The method of claim 1, wherein the predicting failures for the plurality of storage devices comprises:
   inputting the local attribute information for each of the plurality of storage devices into a local prediction module of the trained machine-learning model to generate local failure prediction information for each of the plurality of storage devices;
   inputting the global attribute information for each of the plurality of storage devices into a global prediction module of the trained machine-learning model to generate global failure prediction information for each of the plurality of storage devices; and
   inputting the local failure prediction information and the global failure prediction information for each of the plurality of storage devices into a decision module of the trained machine-learning model to output at least one of the following failure information for each of the plurality of storage devices: whether a failure may occur for each of the plurality of storage devices, a type of the failure that may occur for each of the plurality of storage devices, and a remaining lifetime of each of the plurality of storage devices.

7. The method of claim 6, wherein each of the local prediction module, the global prediction module and the decision module comprises at least one of a collection of decision trees or a neural network.

8. A failure prediction apparatus for a storage apparatus comprising a plurality of storage devices, comprising:
   a combining unit configured to generate a plurality of attributes for the plurality of storage devices by replacing a portion of failure samples in an attribute sequence of one of the storage devices with a portion of failure samples in an attribute sequence of another of the storage devices among the plurality of storage devices;
   a second obtaining unit configured to generate local attribute information of the plurality of attributes corresponding to a second time window before the current time for each of the plurality of storage devices of the storage apparatus;
   a first obtaining unit configured to generate global attribute information for each of the plurality of storage devices based on the local attribute information of the plurality of attributes corresponding to a first time window before the current time, the global attribute information comprising at least one of a distribution characteristic of attribute information of each of the plurality of attributes for the each storage device, a trend characteristic of attribute information of the each attribute for the each storage device and host attribute information, wherein the host attribute information is indicated by statistical information of the attribute information of the plurality of attributes for the plurality of storage devices obtained within the first time window; and a predicting unit configured to predict failures for the plurality of storage devices using a trained machine-learning model based on the generated global attribute information and the generated local attribute information of the generated plurality of attributes of the each of the plurality of storage devices, wherein the plurality of storage devices are wear-leveled based on the predicted failure, wherein at least one of the first time window begins before the second time window, or a duration of the first time window is greater than a duration of the second time window.

9. The failure prediction apparatus of claim 8,
wherein the global attribute information is generated by performing processing based on one of random forest, convolutional network, or long short-term memory.

10. The failure prediction apparatus of claim 8, wherein the distribution characteristic of attribute information of the each attribute comprises a histogram characteristic of attribute information of the each attribute, the trend characteristic of attribute information of the each attribute comprises a statistical characteristic of attribute information of the each attribute, and the statistical information corresponding to the attribute information of the each attribute for the plurality of storage devices is represented by at least one of an average of attribute information of the each attribute for the plurality of storage devices, an average of distribution characteristics of attribute information of the each attribute of the plurality of attributes for the plurality of storage devices and an average of trend characteristics of attribute information of the each attribute of the plurality of attributes for the plurality of storage devices.

11. The failure prediction apparatus of claim 8, wherein the attribute information of the plurality of attributes for the plurality of storage devices of the storage apparatus during operation comprises Self-Monitoring Analysis and Reporting Technology (SMART information for the each of the plurality of storage devices, and/or random-access memory (RAM)-related information for the each of the plurality of storage devices, and performance statistics information for the each of the plurality of storage devices.

12. The failure prediction apparatus of claim 8, wherein the failure predicting unit is configured to:
input the local attribute information of the plurality of attributes for each of the storage devices into a local prediction module of the trained machine-learning model to generate local failure prediction information for each of the plurality of storage devices;
input the global attribute information for each of the plurality of storage devices into a global prediction module of the trained machine-learning model to generate global failure prediction information for each of the plurality of storage devices; and
input the local failure prediction information and the global failure prediction information for each of the plurality of storage devices into a decision module of the trained machine-learning model to output at least one of the following failure information for each of the plurality of storage devices: whether a failure may occur for each of the plurality of storage devices, a type of the failure that may occur for each of the plurality of storage devices, and a remaining lifetime of each of the plurality of storage devices.

13. The failure prediction apparatus of claim 12, wherein each of the local prediction module, the global prediction module and the decision module comprises at least one of a collection of decision trees or a neural network.

14. A non-transitory computer-readable storage medium storing a computer program, which when executed by a processor, executes a failure prediction method for a storage apparatus comprising a plurality of storage devices, the method comprising the steps of:
generating a plurality of attributes for the plurality of storage devices by replacing a portion of failure samples in an attribute sequence of one of the storage devices with a portion of failure samples in an attribute sequence of another of the storage devices among the plurality of storage devices;
generating global attribute information for each of the plurality of storage devices based on attribute information of the plurality of attributes corresponding to a first time window before the current time, the global attribute information comprising at least one of a distribution characteristic of attribute information of each of the plurality of attributes for the each storage device, a trend characteristic of attribute information of the each attribute for the each storage device and host attribute information, wherein the host attribute information is indicated by statistical information of the attribute information of the plurality of attributes for the plurality of storage devices generated within the first time window;
generating local attribute information for each of the plurality of storage devices based on attribute information of the plurality of attributes corresponding to a second time window before a current time;
predicting failures for the plurality of storage devices using the trained machine-learning model based on the generated global attribute information and the generated local attribute information of the generated plurality of attributes of the each of the plurality of storage devices;
wear-leveling the plurality of storage devices based on the predicted failure,
wherein at least one of the first time window begins before the second time window, or a duration of the first time window is greater than a duration of the second time window.

15. The storage medium of claim 14,
wherein generating global attribute information comprises at least one of random forest processing or neural network processing,
wherein the trained machine-learning model comprises at least the other of random forest processing or neural network processing.

16. The storage medium of claim 14,
wherein the portions of failure samples in an attribute sequence of the one and the other storage devices are randomly selected from samples in the attribute sequences of the one and the other storage devices.

17. The storage medium of claim 14,
wherein the processor is a host connected to the storage medium,
wherein each of the plurality of storage devices is connected to the host.

18. The storage medium of claim 14,
wherein the processor is a Universal Flash Storage (UFS) system connected to the storage medium,
wherein at least one of the plurality of storage devices is a UFS device connected to the UFS system, further comprising a UFS interface configured for communications between a UFS host and the UFS device.

19. The storage medium of claim 14 disposed in a data center system, the data center system further comprising:
a plurality of application servers; and
a plurality of storage servers,
wherein each storage server comprises a plurality of storage devices,
wherein the processor comprises at least one of the plurality of application servers or at least one of the plurality of storage servers that is configured to perform the failure prediction method.

20. The storage medium of claim 14 disposed in an electronic device, the electronic device further comprising the processor.

* * * * *